US011215804B2

(12) United States Patent
Knebel et al.

(10) Patent No.: US 11,215,804 B2
(45) Date of Patent: Jan. 4, 2022

(54) MICROSCOPE AND METHOD FOR IMAGING A SAMPLE

(71) Applicant: Leica Microsystems CMS GmbH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 649 days.

(21) Appl. No.: 16/091,524

(22) PCT Filed: Apr. 7, 2017

(86) PCT No.: PCT/EP2017/058427
§ 371 (c)(1),
(2) Date: Oct. 5, 2018

(87) PCT Pub. No.: WO2017/174795
PCT Pub. Date: Oct. 12, 2017

(65) Prior Publication Data
US 2019/0129153 A1 May 2, 2019

(30) Foreign Application Priority Data

Apr. 8, 2016 (LU) .......................................... 93021

(51) Int. Cl.
*G02B 21/32* (2006.01)
*G02B 21/00* (2006.01)
(Continued)

(52) U.S. Cl.
CPC ....... *G02B 21/0032* (2013.01); *G02B 21/002* (2013.01); *G02B 21/006* (2013.01);
(Continued)

(58) Field of Classification Search
CPC .... G02B 21/06; G02B 21/0076; G02B 21/16; G02B 21/0032; G02B 27/58;
(Continued)

(56) References Cited

U.S. PATENT DOCUMENTS 8,582,203 B2   11/2013   Dunsby et al.
8,619,237 B2   12/2013   Hillman et al.
(Continued)

FOREIGN PATENT DOCUMENTS

DE   102011000835 B4   8/2012
EP   2803977 A1   11/2014
(Continued)

OTHER PUBLICATIONS

Kavya Mohan et al: "Three Dimensional Fluorescence Imaging Using Multiple Light-Sheet Microscopy", PLOS ONE, vol. 9, No. 6, Jun. 9, 2014 (Jun. 9, 2014), p. e96551, XP055277114.
(Continued)

*Primary Examiner* — Collin X Beatty
*Assistant Examiner* — Grant A Gagnon
(74) *Attorney, Agent, or Firm* — Leydig, Voit & Mayer, Ltd.

(57) ABSTRACT

A microscope for imaging a sample includes an illumination unit for emitting illumination light to the sample; a detector for capturing a detection light originating from the sample; an optical system for focusing the illumination light onto the sample and focusing the detection light onto the detector; and a scanning unit for scanning the sample using the illumination light. The illumination unit emits the illumination light as separate illumination light beams which can be focused on spatially mutually separated, strip-like sample regions simultaneously. The detector captures the detection light in the form of separate detection light beams originating from the sample regions simultaneously and in a spa-
(Continued)

tially mutually separated manner. The sample regions are in sample planes, and the detector having sub-detectors, which are each assigned to a sample plane and capture a detection light beam that originates from a respective sample plane.

21 Claims, 9 Drawing Sheets

(51) Int. Cl.
*G02B 21/36* (2006.01)
*G02B 21/06* (2006.01)

(52) U.S. Cl.
CPC ......... *G02B 21/0048* (2013.01); *G02B 21/06* (2013.01); *G02B 21/367* (2013.01)

(58) Field of Classification Search
CPC .... G02B 21/365; G02B 21/367; G02B 21/26; G02B 21/10; G02B 21/008; G02B 21/14; G02B 21/0072; G02B 21/086; G02B 21/002; G02B 21/0024; G02B 21/361; G02B 21/0048; G02B 21/006; G02B 21/0088; G02B 21/0092; G02B 21/08; G02B 21/36; G02B 21/00; G02B 21/0004; G02B 21/0016; G02B 21/0044; G02B 21/0056; G02B 21/025; G02B 21/082; G02B 21/24; G02B 21/0012; G02B 21/0036; G02B 21/004; G02B 21/0064; G02B 21/02; G02B 21/084; G02B 21/088; G02B 21/18; G02B 21/22; G02B 21/32; G02B 21/34; G02B 2207/113; G02B 26/0833; G02B 27/0068; G02B 19/0028; G02B 21/0008; G02B 21/0068; G02B 21/125; G02B 21/248; G02B 21/362; G02B 2207/114; G02B 26/0816; G02B 27/1006; G02B 5/3083; G02B 7/14; G02B 13/0095; G02B 15/142; G02B 15/144109; G02B 17/0896; G02B 19/0066; G02B 19/0076; G02B 19/008; G02B 19/0085; G02B 19/0095; G02B 1/02; G02B 21/0028; G02B 21/0096; G02B 21/12; G02B 21/241; G02B 21/33; G02B 21/364; G02B 23/2438; G02B 26/02; G02B 26/06; G02B 26/105; G02B 27/0025; G02B 27/0031; G02B 27/0075; G02B 27/0081; G02B 27/0911; G02B 27/0927; G02B 27/10; G02B 27/1013; G02B 27/106; G02B 27/126; G02B 27/141; G02B 27/145; G02B 27/283; G02B 27/30; G02B 27/425; G02B 27/4261; G02B 27/56; G02B 27/60; G02B 5/005; G02B 5/0278; G02B 5/04; G02B 5/09; G02B 5/1814; G02B 5/20; G02B 5/288; G02B 5/3016; G02B 6/06; G02B 6/065; G02B 6/4206; G02B 7/003; G02B 7/09; G02B 7/16; G02B 7/28
USPC ........................................................ 359/385
See application file for complete search history.

(56) References Cited

U.S. PATENT DOCUMENTS

| 2008/0111911 | A1 | 5/2008 | Kawanabe |
| 2011/0115897 | A1 | 5/2011 | Najmabadi et al. |
| 2013/0107358 | A1 | 5/2013 | Knebel et al. |
| 2013/0335818 | A1 | 12/2013 | Knebel et al. |
| 2014/0340483 | A1 | 11/2014 | Ritter et al. |
| 2015/0177506 | A1 | 6/2015 | Nishiwaki |
| 2017/0068080 | A1 | 3/2017 | Anhut et al. |
| 2017/0115475 | A1 | 4/2017 | Dodt et al. |

FOREIGN PATENT DOCUMENTS

| JP | 2008-122857 A | 5/2008 |
| JP | 2013-097380 A | 5/2013 |
| JP | 2014-142657 A | 8/2014 |
| JP | 2015-090458 A | 5/2015 |
| JP | 2015-203730 A | 11/2015 |
| WO | WO 2015109323 A2 | 7/2015 |
| WO | WO 2015/124648 A1 | 8/2015 |
| WO | WO 2015/179240 A1 | 11/2015 |
| WO | WO 2015184124 A1 | 12/2015 |
| WO | WO 2015189240 A1 | 12/2015 |

OTHER PUBLICATIONS

Paul A. Dalgarno et al: "Multiplane imaging and three dimensional nanoscale particle tracking in biological micrcoscopy", Optics Express, vol. 18, No. 2, Jan. 18, 2010 (Jan. 18, 2010), p. 877, XP055123803.
Matthew B. Bouchard, et al., "Swept confocally-aligned planar excitation (SCAPE) microscopy for high-speed volumetric imaging of behaving organisms", nature photonics, Jan. 19, 2015, pp. 1-7.
C. Dunsby, "Optically sectioned imaging by oblique plane microscopy", Optics Express, vol. 16, No. 25, Dec. 8, 2008, pp. 1-11.
Sunil Kumar, et al., "High.speed 2D and 3D fluorescence microscopy of cardiac myocytes", Optics Express, vol. 19, No. 15, Jul. 18, 2011, pp. 1-9.
Makio Tokunaga, et al., "Highly inclined thin illumination enables clear single-molecule imaging in cells", Nature Methods, vol. 5, No. 2, Feb. 2008, pp. 159-161.

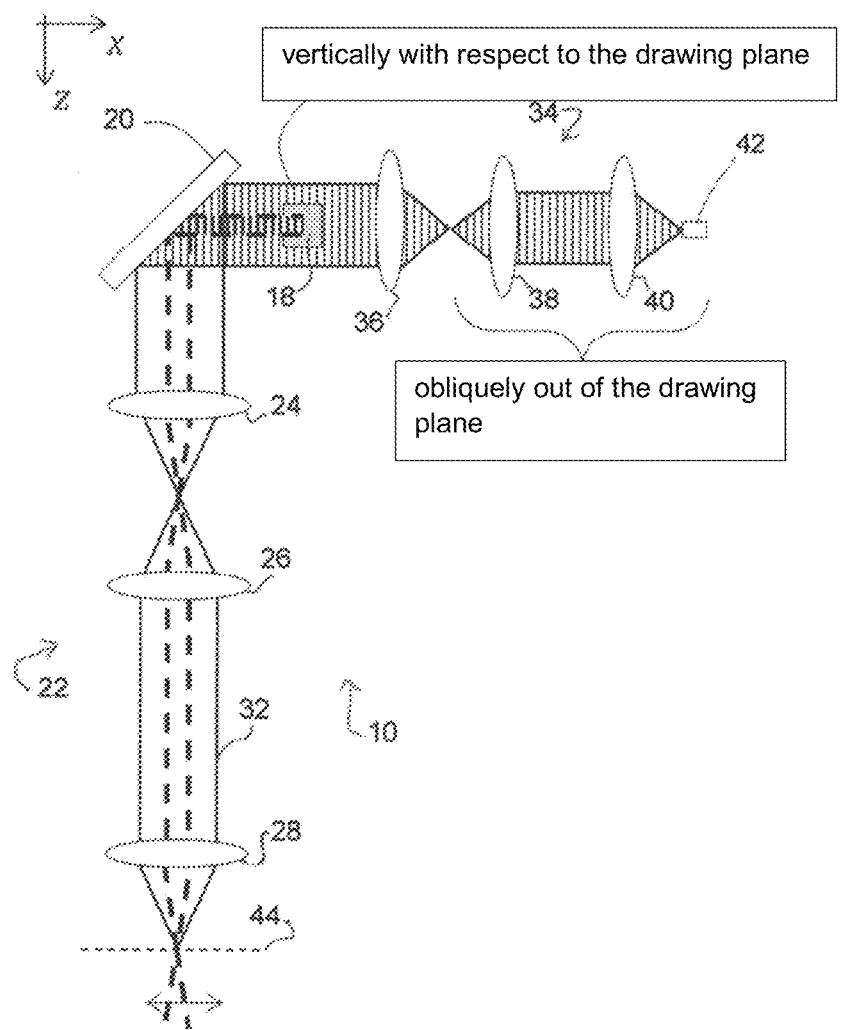

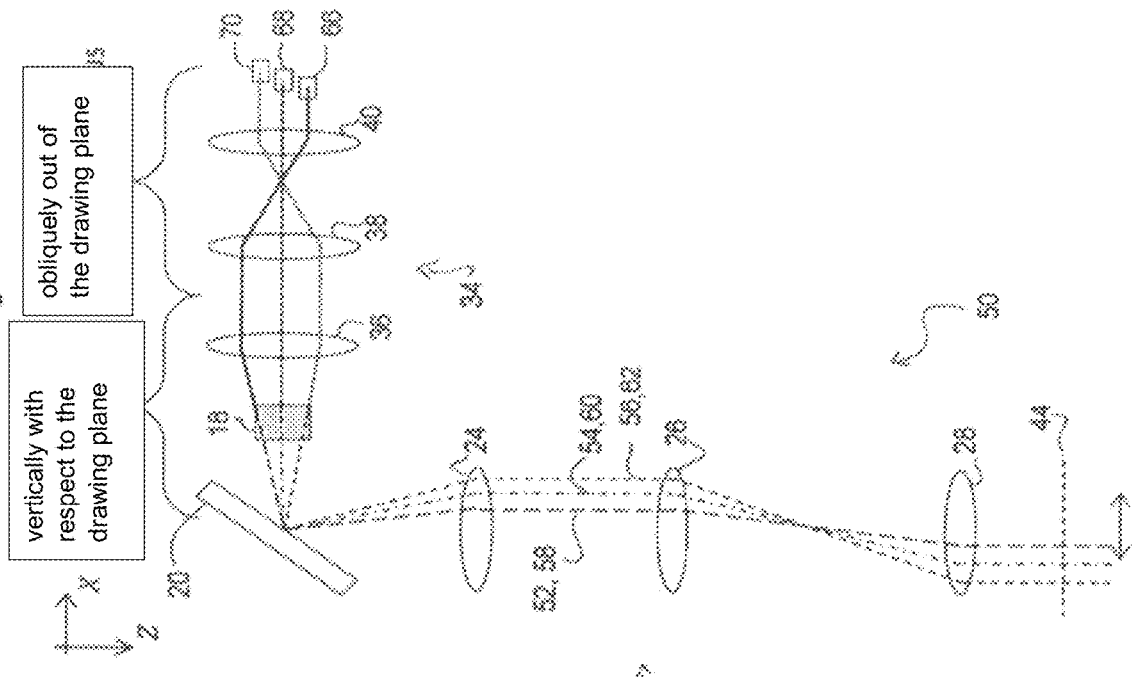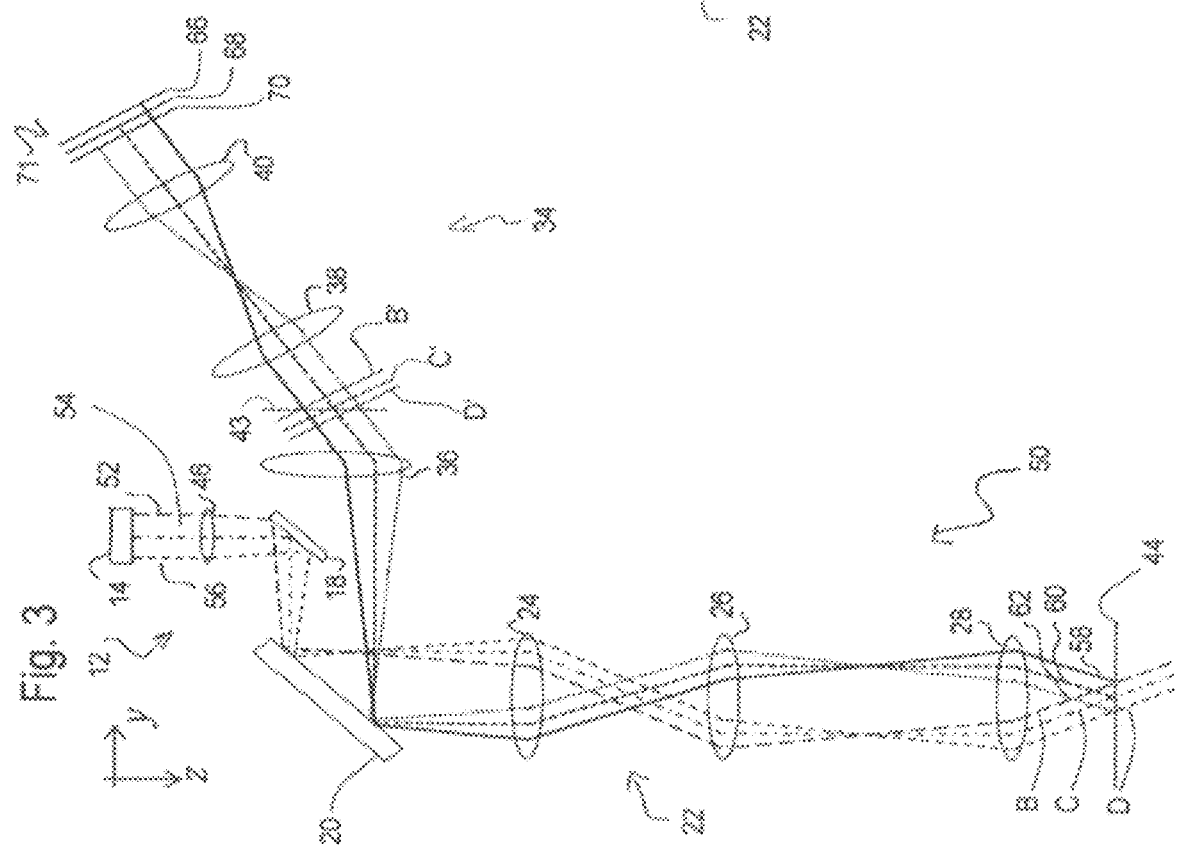

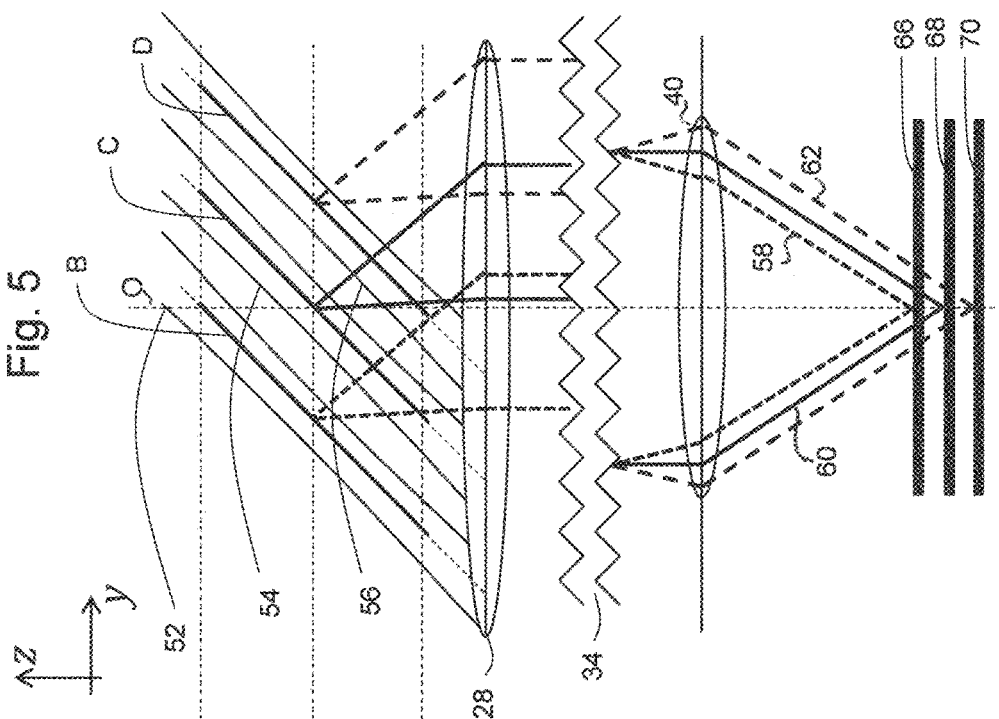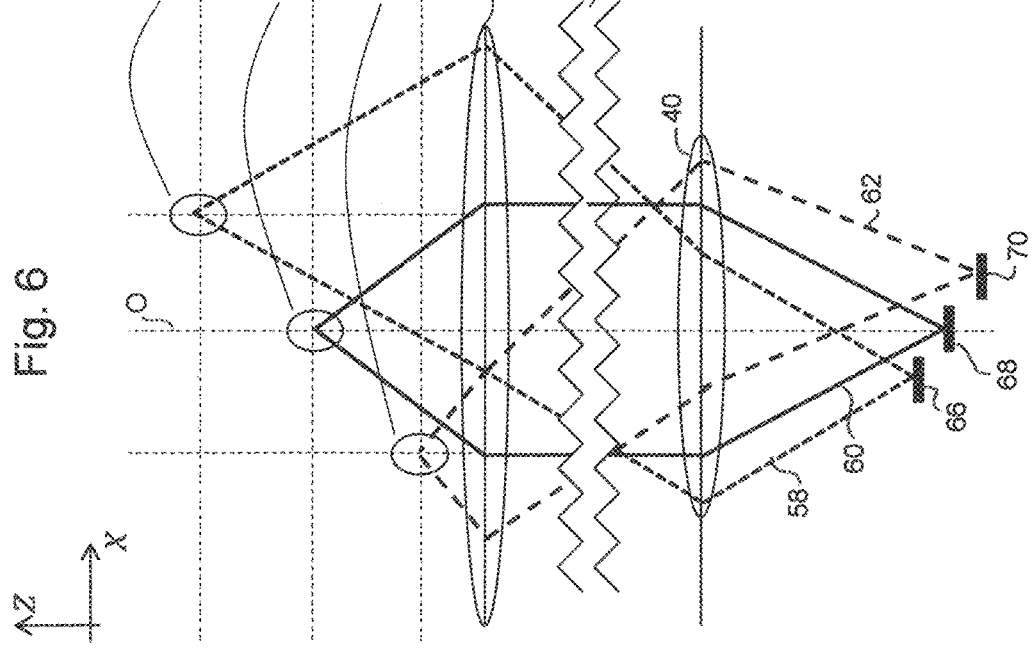

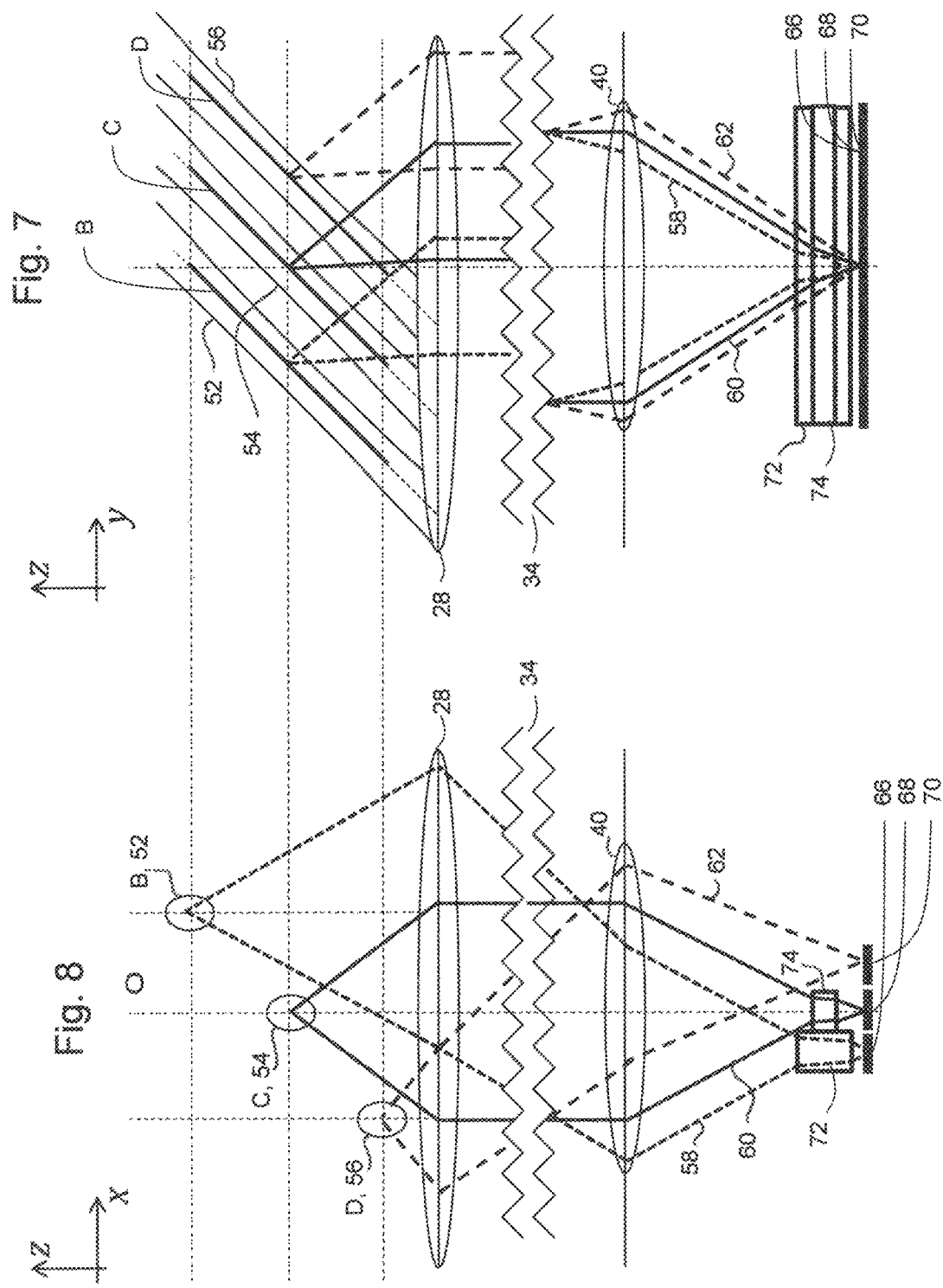

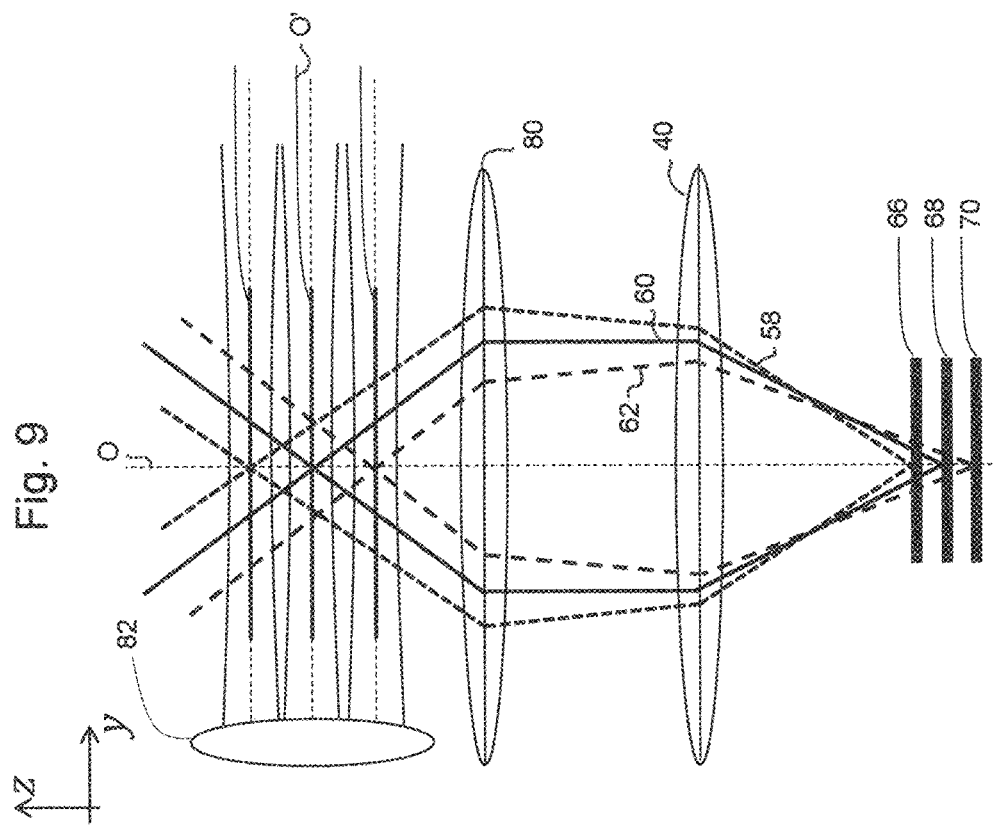
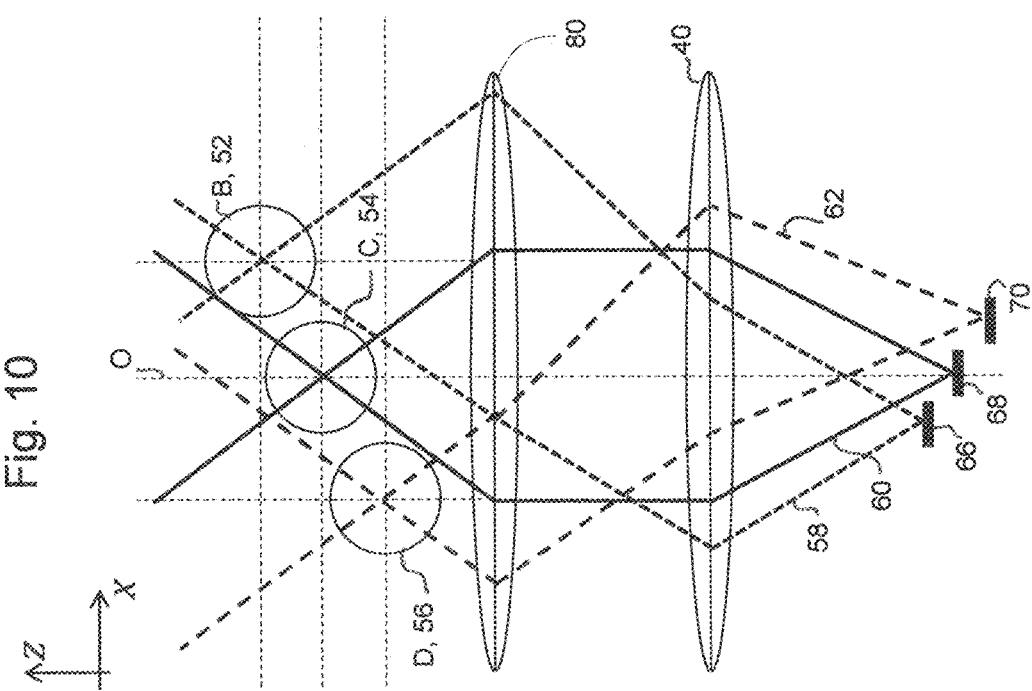

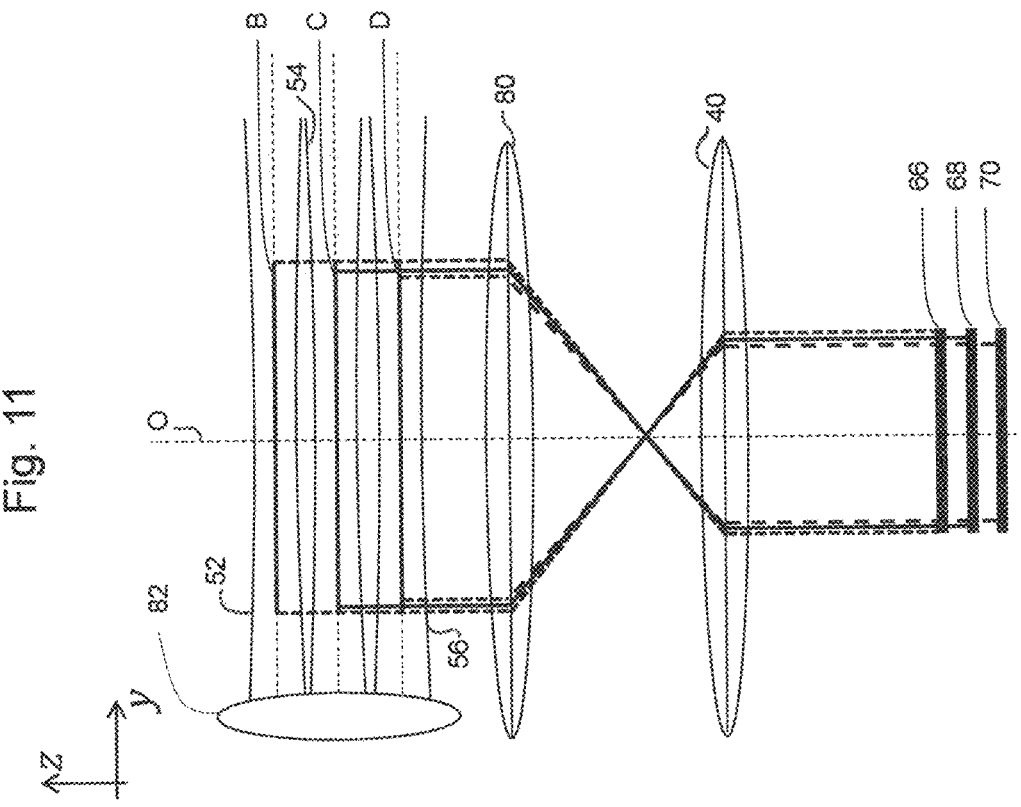
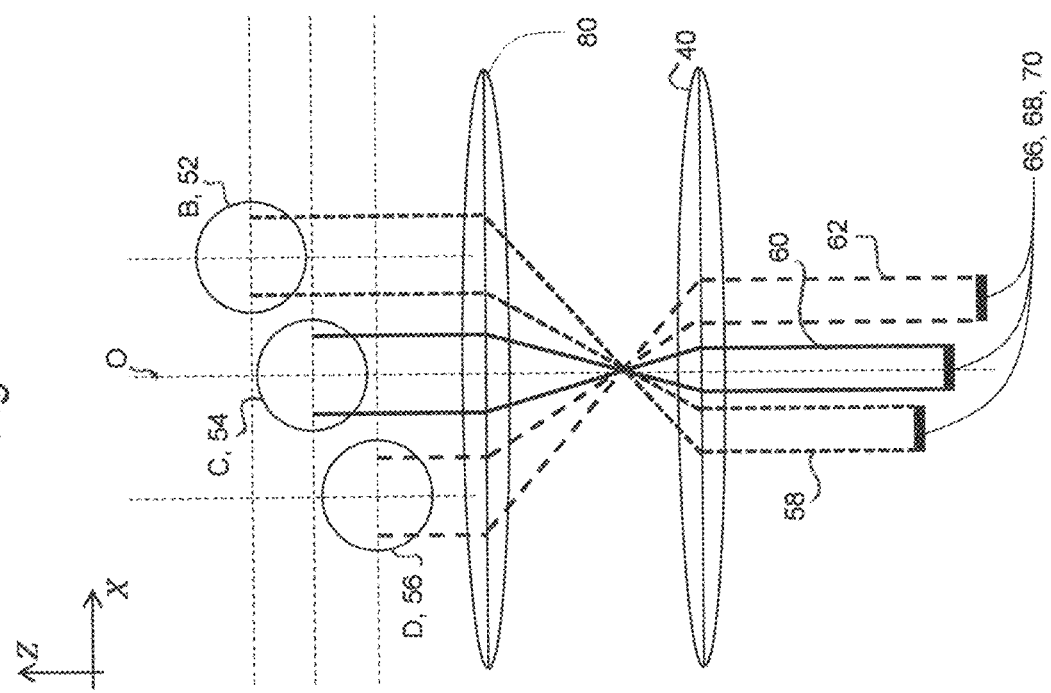

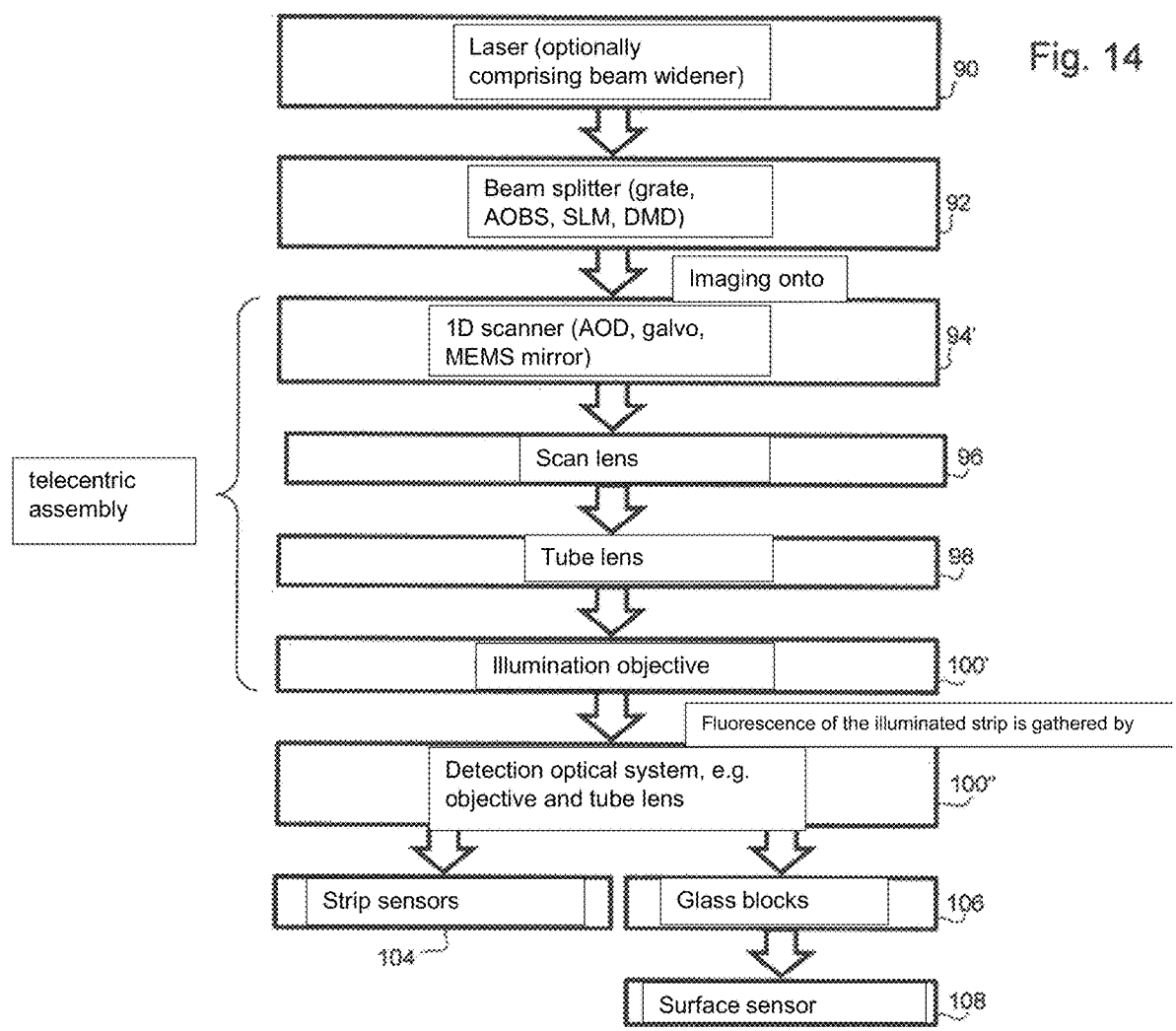

MICROSCOPE AND METHOD FOR IMAGING A SAMPLE

CROSS-REFERENCE TO PRIOR APPLICATIONS

This application is a U.S. National Stage Application under 35 U.S.C. § 371 of International Application No. PCT/EP2017/058427 filed on Apr. 7, 2017, and claims benefit to Luxembourgian Patent Application No. LU 93021 filed on Apr. 8, 2016. The International Application was published in German on Oct. 12, 2017, as WO 2017/174795 A1 under PCT Article 21(2).

FIELD

The invention relates to a microscope and method for imaging a sample.

BACKGROUND

In particular in fluorescence microscopy, microscope methods have begun to be used in which the sample is illuminated in a manner having a planar or linear light distribution. Examples thereof are microscopy methods that are known under the designations SPIM (Single Plane Illumination Microscopy), OPM (Oblique Plane Microscopy) and SCAPE (Swept Confocally-Aligned Planar Excitation). Thus, for example in the case of a SPIM microscope, an illumination light beam is focused in just one direction, e.g. using a cylindrical lens, and is thus widened, as a result of which the sample is illuminated by a light sheet or a light pane which illuminates just one sample plane within the sample. For illumination and detection, a SPIM microscope includes two separate objectives on the sample side, the optical axes of which extend so as to be mutually perpendicular. The sample plane to be imaged is perpendicular to the optical axis of the detection objective. The sample plane is illuminated by the light sheet which the illumination objective radiates into the sample perpendicularly to the optical axis of the detection objective.

In contrast, in the SCAPE method just one sample-side objective is used for both illumination and detection. The illumination is achieved by means of a light sheet that is oblique with respect to the optical axis of the objective. Owing to the oblique positioning of the light sheet, a SCAPE microscope usually includes an erecting optical system that includes mutually oblique partial optical systems, interacts with the objective and ensures, by means of intermediate imaging, that the sample region illuminated by the oblique light sheet is imaged in the correct position on the detector.

In order to further explain the above-mentioned SPIM, OPM and SCAPE methods, reference is made by way of example to the disclosures of Kumar, S. et al., High-speed 2D and 3D fluorescence microscopy of cardiac myocytes. Opt. Express 19, 13839 (2011); Dunsby, C., Optically sectioned imaging by oblique plane microscopy, Opt. Express 16, 20306-20316 (2008) and Bouchard, M. B. et al., Swept confocally-aligned planar excitation (SCAPE) microscopy for high speed volumetric imaging of behaving organisms, Nat. Photonics 9,113-119 (2015), and to U.S. Pat. Nos. 8,582,203 B2 and 8,619,237 B2.

A related microscopy method which, however, forgoes an erecting optical system is known as the HILO method (Highly Inclined And Laminated Optical Sheet). In this regard, reference is made to Tokunaga, M., Imamoto, N. & Sakata-Sogawa, K., Highly inclined thin illumination enables clear single-molecule imaging in cells., Nat. Methods 5, 159-161 (2008).

In DE 10 2011 000 835 B4, the light sheet intended for oblique illumination of the sample is produced using a scanning unit which is located in a plane conjugate with the rear focal plane of the illumination objective. The fluorescence light to be detected is coupled out between the objective and the scanning unit.

Reference is lastly made to WO 2015/109323 A2, which discloses inter alia a microscope structure in which a dichroic mirror for separating the fluorescence light to be detected is arranged behind a scanning mirror in the light direction, such that the fluorescence light is descanned directly by the scanning mirror. This structure largely corresponds to the structure of a point-scanning confocal microscope. However, it differs therefrom in that the illumination beam is weakly focused and is directed obliquely into the sample. Furthermore, the fluorescence light collected from the focal line extending counter to the focal plane of the objective is erected using an erecting optical system. It is thus possible to acquire image information along the illuminated line, using a line sensor. Since the scanning mirror is used both for scanning the sample using the illumination beam and also for descanning the detected fluorescence light, a stationary detector can be used.

SUMMARY

An embodiment of the present invention provides a microscope for imaging a sample that includes an illumination unit configured to emit an illumination light to the sample; a detector configured to capture a detection light originating from the sample; an optical system configured to focus the illumination light, emitted by the illumination unit, into the sample and configured to focus the detection light, originating from the sample, onto the detector; and a scanning unit configured to scan the sample using the illumination light. The illumination unit is configured to emit the illumination light to the scanning unit in the form of separate illumination light beams, such that, during scanning of the sample, the illumination light beams can be focused on spatially mutually separated, strip-like sample regions simultaneously. The detector is configured to capture the detection light in the form of separate detection light beams originating from the spatially mutually separated, strip-like sample regions simultaneously and in a spatially mutually separated manner. The sample regions illuminated by the illumination light beams are located in a plurality of sample planes, and the detector has a plurality of sub-detectors which are each assigned to one of the sample planes, respectively, the respective sub-detector configured to capture a detection light beam of the detection light beams that originates from the sample plane assigned to the sub-detector.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 shows the conventional SCAPE microscope according to FIG. 1, from a different viewing direction;

FIG. 3 shows a microscope according to the invention that operates in the manner of a SCAPE microscope, as a first embodiment;

FIG. 4 shows the first embodiment of the microscope according to the invention, from a different viewing direction;

FIG. 5 is a schematic view to show how the sample regions, illuminated by the illumination light beams, are imaged on the detector in the first embodiment;

FIG. 6 is a schematic view corresponding to FIG. 5, from a different viewing direction;

FIG. 7 is a schematic view to show how the sample regions, illuminated by the illumination light beams, are imaged on the detector in a second embodiment of the microscope according to the invention;

FIG. 8 is a schematic view corresponding to FIG. 7, from a different viewing direction;

FIG. 9 is a schematic view to show how the sample regions, illuminated by the illumination light beams, are imaged on the detector in a third embodiment of the microscope according to the invention;

FIG. 10 is a schematic view corresponding to FIG. 9, from a different viewing direction;

FIG. 11 is a schematic view corresponding to FIG. 9, in which the light beams are of a different geometry;

FIG. 12 is a schematic view corresponding to FIG. 10, in which the light beams are of a different geometry;

FIG. 14 is a block diagram having functional components, by way of example, for implementing a microscope according to the invention that operates in the manner of a SPIM microscope.

DETAILED DESCRIPTION

Figure 1:
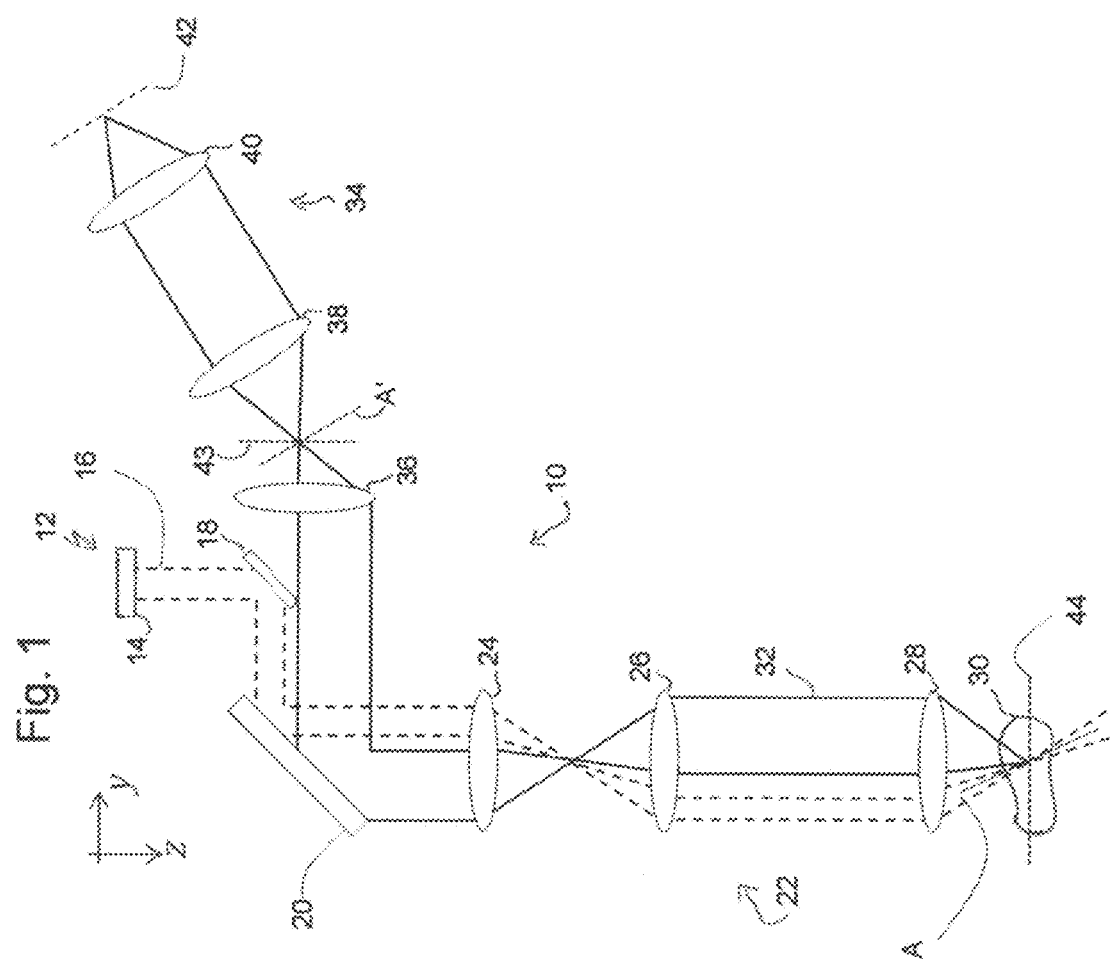
FIG. 1 shows a conventional SCAPE microscope as a comparative example.

The methods explained above, in each case, provide for the detection of just one sample plane at a specified point in time. It is thus comparatively complex to image a large sample volume. In some of these methods, concentration of the illumination light on a single sample plane may in addition result in undesired saturation of fluorophores.

Embodiments of the present invention specify a microscope and a method for imaging a sample which allow for efficient and careful volume imaging.

The embodiments of the present invention provide a microscope for imaging a sample, the microscope having an illumination unit for emitting illumination light to the sample, a detector for capturing detection light originating from the sample, an optical system for focusing the illumination light, emitted by the illumination unit, into the sample and for focusing the detection light, originating from the sample, onto the detector, and a scanning unit for scanning the sample using the illumination light. The embodiments of the present invention further provide a method for microscopic imaging of a sample.

The microscope according to an embodiment of the invention includes an illumination unit for emitting illumination light to the sample, a detector for capturing detection light originating from the sample, an optical system for focusing the illumination light, emitted by the illumination unit, into the sample and for focusing the detection light, originating from the sample, onto the detector, and a scanning unit for scanning the sample using the illumination light. The illumination unit is designed to emit the illumination light to the scanning unit in the form of separate illumination light beams, such that, during scanning of the sample, the illumination light beams can be focused on spatially mutually separated sample regions simultaneously. The detector is designed to capture the detection light in the form of separate detection light beams, originating from the spatially mutually separated linear or strip-like sample regions, simultaneously and in a spatially mutually separated manner.

The invention makes it possible for a plurality of spatially mutually separated sample regions to be illuminated simultaneously and captured in a spatially mutually separated manner. For this purpose the detector includes quasi separate detection channels which are assigned to the spatially mutually separated sample regions. The separation of the illumination light beams within the sample is selected such that crosstalk of the detection light from the detection channel assigned thereto into another detection channel is reliably prevented. Crosstalk of this kind would result in an increase in the interfering background signal, and thus a reduction in the image contrast, in the individual images. If it is assumed that the optical system according to the invention, which focusses the detection light, originating from the sample, onto the detector, defines, for each illuminated sample region, a detection volume in the form of a point spread function, PSF for short, the desired beam separation within the sample can be appropriately specified, taking account of the PSF.

The microscope according to the invention can be operated both in the manner of a conventional SPIM microscope and in the manner of a conventional SCAPE or OPM microscope, with the difference that, at a specified point in time, a plurality of spatially mutually separated sample regions is illuminated, rather than just one continuous sample region. In particular, the illumination light beams can also be used for constructing a plurality of light sheets which illuminate the sample in different sample planes simultaneously. It is thus conceivable, for example, for the light sheet to be constructed sequentially, within a sample plane in question, using the scanning unit. In the sample plane in question, the detector accordingly "sees" the moved illumination light beam in the form of a continuous light distribution that forms the light sheet. Spatially separated capture of the detection light occurs in this case only in relation to the different sample planes, but not within one sample plane in question.

The distribution according to the invention of the illumination light can advantageously be used for careful sample illumination in order in particular to prevent undesired saturation of the fluorophores.

The illumination unit, the scanning unit and the optical system preferably interact such that the illumination light beams have a mutual parallel offset in the sample.

The parallel offset may contain a first parallel offset along a first axis that is perpendicular to the optical axis of a detection objective contained in the optical system, and/or a second parallel offset along a second axis that is perpendicular to the optical axis of the detection objective, the first and the second axis being oriented so as to be mutually perpendicular. The illumination light beams that are offset relative to one another in the sample make it possible to design the detector in a relatively simple manner, such that desired spatially mutually separated capture of the detection light beam is possible.

In an advantageous embodiment, the scanning unit is designed to scan the sample, using the illumination light beams, along a first axis that is perpendicular to the optical axis of a detection objective contained in the optical system, and/or along a second axis that is perpendicular to the optical axis of the detection objective, the first axis and the second axis being oriented so as to be mutually perpendicular. In this embodiment it is possible, for example, to in each case construct a light sheet in the manner described above, by means of the scanning movement along the first axis within the specified sample plane, while the scanning movement along the second axis successively displaces the light sheets, thus constructed, within the sample. This makes particularly efficient volume imaging possible.

In a preferred embodiment, the scanning unit includes a scanning mirror, the scanning mirror being able to be tilted about the second axis in order to scan the sample, using the illumination light beams, along the first axis, and/or the scanning mirror being able to be tilted about a first axis in order to scan the sample, using the illumination light beams, along the second axis. A galvanometer mirror (for example having a gimbal mounting) or a micro-electro-mechanical mirror (MEMS) in the form of a 1D or 2D scanner, for example, can be used as the scanning mirror. It is alternatively also possible to use a combination of two or more mirrors instead of one single scanning mirror. The invention is not limited to a scanning unit of this kind, however. It is thus also conceivable, for example, to use an acousto-optic deflector (ACID). Combinations of the techniques mentioned can of course also be used.

In a particularly preferred embodiment, the optical system contains just one objective that simultaneously forms an illumination objective for focusing the illumination light beams, emitted by the illumination unit, into the sample, and a detection objective for focusing the detection light beam, originating from the sample, onto the detector. In this embodiment, the microscope according to the invention can be operated in the manner of a SCAPE or OPM microscope.

The scanning unit is preferably in addition designed to descan the detection light beams focused on the detector. In this case, "descan" means that the single sample-side objective returns the detection light, originating from the sample, to the scanning unit already acting on the illumination light, before the detection light is incident on the detector. Returning the detection light to the scanning unit in this manner offsets the scanning movement, imparted to the illumination light by the scanning unit, with respect to the detection light in the sense of a counteraction, which particularly advantageously means that it is possible to use a stationary detector for capturing the detection light.

Preferably, the illumination unit and the scanning unit interact such that the illumination light beams are incident into an entrance pupil of the objective in a manner mutually tilted about the second axis in order to bring about the first parallel offset, along the first axis, in the sample, and/or the illumination unit and the scanning unit interact such that the illumination light beams are incident into the entrance pupil of the objective in a manner mutually tilted about the second axis in order to bring about the second parallel offset, along the second axis, in the sample. Tilting the illumination light beams in the objective pupil accordingly results in the illumination light beams, emerging from the objective, being displaced transversely to the optical axis of the objective.

In a preferred embodiment, the illumination unit and the scanning unit interact such that the illumination light beams each illuminate only an off-center portion of an entrance pupil of the objective. This off-center illumination of the objective pupil results in the illumination light beams, emerging from the objective, being positioned obliquely relative to the optical axis of the objective. An erecting optical system that is behind the scanning unit in the propagation direction of the detection light and includes a first partial optical system for generating an intermediate image, and a second partial optical system that is oblique with respect to the first partial optical system and intended for imaging the intermediate image in the correct position on the detector is preferably provided. The erecting optical system thus ensures that the sample region imaged by the objective using the oblique illumination is erected.

In a further preferred embodiment, the optical system contains two separate objectives, one of which forms an illumination objective for focusing the illumination light beams, emitted by the illumination unit, into the sample, and the other of which forms a detection objective for focusing the detection light beam, originating from the sample, onto the detector. In this embodiment, the microscope according to the invention can be operated in the manner of a SPIM microscope. In this embodiment, the optical axis of the illumination objective and the optical axis of the detection objective are preferably perpendicular to one another. The illumination light beams focused into the sample by the illumination objective preferably extend in parallel with the optical axis of the illumination objective, and thus perpendicularly to the optical axis of the detection objective.

In a particularly preferred embodiment, the sample regions illuminated by the illumination light beams are located in a plurality of sample planes that are preferably offset in parallel with one another. The fact that image data is acquired simultaneously from the different sample planes makes volume imaging particularly efficient.

The detector preferably includes a plurality of sub-detectors which are each assigned to one of the sample planes, respectively, the relevant sub-detector capturing the detection light beam that originates from the sample plane assigned to the sub-detector. The sub-detectors form separate detection channels which allow for the detection light beams to be captured in a spatially separated manner.

The sub-detectors are advantageously arranged in a depth-of-field of a detection optical system in front of the detector. In the case of SCAPE application, the detection optical system is formed by the erecting optical system, for example. In this embodiment, it is possible to form the detector in the manner of an integral surface detector including a plurality of linear or strip-like detector regions that form the sub-detectors.

In an alternative embodiment, at least one element is provided which is arranged in front of the detector, is intended for influencing the optical path length, and compensates for the offset of the sample planes.

The element mentioned is for example a glass block that compensates for the offset of the illumination light beams along the optical axis of the detection objective in order to allow for a sharp image of the sample plane illuminated in each case. It is possible to use an integral surface detector in this embodiment too.

In a further preferred embodiment, the detector includes a plurality of line detectors that form the sub-detectors. This embodiment makes it possible to arrange the line detectors along the optical axis of the detection objective such that the axial offset of the illumination light beams within the sample is taken into account.

It is also possible to provide an appropriate optical system for each individual illumination light beam, which optical system ensures sharp imaging on the associated line detector. It should be noted at this point that the axial offset of the illumination light beams within the sample is typically in a range of just a few micrometers and is therefore so small that it is generally not necessary to correct imaging errors, in particular spherical aberrations.

In an alternative embodiment, the sample regions illuminated by the illumination light beams may also be located just in one sample plane. In this case, the illumination light beams scan the sample in just one sample plane. It is thus possible to generate images of the one sample plane in very quick succession. The time between the individual photographs of the sample plane may be significantly less than the time that a single camera would require in order to image the entire image field a plurality of times in succession. The time between the individual photographs is even far less than the time required for exposing a single sample plane. In this embodiment, it is possible, for example, to record image sequences that are intended to represent processes that take place extremely rapidly. Technically very complex double pulse systems are thus known from PIV (Particle Image Velocimetry) microscopy for example, in which systems an expensive laser is used, which laser emits two extremely strong light pulses in quick succession. A camera accordingly records two images. However, the system formed by the camera and laser requires a long pause following each of the double pulses before a further image pair can be recorded. This technique is very valuable for analyzing flow patterns which do not, however, need to be in flow equilibrium because the overall flow pattern can be calculated simply from a plurality of image pairs. In the embodiment mentioned above, the microscope according to the invention can be used for example for corresponding observation of extremely rapid processes in biomedical research.

The illumination unit may include just one light source which emits the separate illumination light beams. It is also possible, however, to provide an individual light source for each illumination light beam, as a result of which coherence between the individual illumination light beams can be prevented.

The illumination unit is preferably designed to emit the illumination light beams such that the beams have different wavelengths. The different wavelengths can accordingly be separated from a single broadband light source or may originate from different light sources. In this embodiment it is conceivable, for example, to displace the wavelengths of the illumination light beams with respect to one another so significantly that the illumination light beams excite different fluorophores, the fluorescence light of which can be spectrally separated using simple filters. In this case, the illumination light beams do not necessarily need to be offset in the scanning direction (perpendicularly to the propagation direction of the illumination light beams in the sample plane) or to extend in different sample planes.

In an advantageous embodiment, the detector includes a TDI (Time Delay Integration) line scan camera. A TDI line scan camera of this kind consists of a plurality of mutually adjacent sensor lines and allows for time-delayed multiple exposure of a moving object. At the end of each exposure period, the batches generated thus far are displaced, line-by-line, into the next highest line in each case. During the following exposure periods, further batches are added, which are added up, transported further line-by-line, and finally emitted as a signal, following a number of instances of exposure that corresponds to the number of sensor lines. In the present context, a TDI line scan camera of this kind can be used to capture the detection light beams in a linear manner without it being necessary to use a one-line sensor. A detection light beam is thus generally wider than a single pixel line of a one-line sensor, and therefore the detection light beam significantly outshines the pixel line. In contrast with a one-line sensor, a TDI line scan camera makes it possible to sense the entire width of the detection light beam without the detection signal becoming blurred. In particular, it is not necessary to scan in steps for this purpose. Instead, a TDI line scan camera allows for continuous scanning.

The scanning unit and the optical system preferably form a telecentric system.

According to a further aspect of the invention, a method for microscopic imaging of a sample is proposed. The method is intended in particular to be applied in the manner of a SPIM, OPM or SCAPE method. The method may also be combined with pulsed lasers for two-photon excitation.

The invention will be explained in greater detail in the following, on the basis of embodiments and with reference to the drawings The structure of a conventional SCAPE microscope 10 will first be explained with reference to FIGS. 1 and 2, to which microscope reference will be made in the following in order to explain the embodiments according to the invention. In FIGS. 1 and 2, and in all the further figures, reference is made in each case to an orthogonal coordinate system having the axes x, y and z.

As shown in FIGS. 1 and 2, the SCAPE-microscope 10 contains an illumination unit 12 having a light source 14 which emits an illumination light beam 16. The illumination light beam 16 impinges on a mirror 18 that reflects the illumination light beam 16 towards a 2D-scanning mirror 20. The scanning mirror 20, which is designed as a galvanometer mirror or MEMS mirror for example, can be tilted about the x-axis (perpendicularly to the drawing plane in FIG. 1) and about the y-axis (perpendicularly to the drawing plane in FIG. 2) by means of a drive. The illumination light beam 16 reflected on the scanning mirror 20 enters an optical system 22 that is formed of a scan lens 24, a tube lens 26 and an objective 28. The scanning mirror 20 is located in a plane conjugate with the rear focal plane of the illumination objective 28. The scanning mirror 20 and the optical system 22 form a telecentric system.

As shown in FIG. 1, the illumination light beam 16 is incident on the scanning mirror 20 such that it is radiated into the objective 28 in a manner offset along the y-axis. The illumination light beam 16 accordingly illuminates only an off-center portion of the entrance pupil of the objective 28, and therefore propagates within the sample 30 in a manner tilted with respect to the optical axis of the objective 28. The illumination light beam 16 thus illuminates the sample 30 along a linear or strip-like region, denoted by A in FIG. 1, and there excites a sample 30 to emit fluorescent radiation. In order to simplify the depiction, the sample 30 is shown only in FIG. 1.

The detection light beam provided by the fluorescent radiation and denoted 32 in FIGS. 1 and 2 in turn enters the objective 28, which functions both as the illumination objective and as the detection objective. After passing through the tube lens 26 and the scan lens 24, the detection light beam 32 is incident on the scanning mirror 20 which reflects the detection light beam 32 such that the light beam bypasses the mirror 18 and enters the erecting optical system 34. The erecting optical system 34 includes a second objective 36, a third objective 38, and a tube lens 40 that is arranged behind a line detector 42. The detection light beam 32 is descanned by means of being returned on the scanning mirror 20 in a manner similar to that in a confocal microscope. In this manner, the illuminated sample region A is imaged in a stationary strip A' by means of intermediate imaging in the erecting optical system 34. The strip A' is oblique with respect to a plane 43 that is optically conjugate with the focal plane of the optical system 22 denoted 44 in FIGS. 1 and 2.

As shown in FIG. 1, the erecting optical system 34 includes a first partial optical system in the form of the objective 36, and a second partial optical system that is oblique with respect thereto and is formed by the objective 38 and the tube lens 40. The two mutually oblique partial optical systems 36 and 38, 40, respectively, cause the strip A' to be imaged in the correct position on the line detector 42. The descanning effect of the scanning mirror 20 additionally ensures that the illuminated sample region A is imaged in a stationary manner on the line detector 42 by means of the stationary intermediate image A'.

It should be noted at this point that the depiction of the detection beam path is highly simplified in FIG. 2. In reality, the part of the detection beam path located between the scanning mirror 20 and the objective 36 extends perpendicularly to the drawing plane of FIG. 2, while the part of the detection beam path that adjoins the part in the direction of the line detector 42 extends obliquely out of the drawing plane of FIG. 2.

FIGS. 3 and 4 show a microscope 50 that is a development, according to the invention, of the SCAPE microscope 10 according to FIGS. 1 and 2. The microscope 50 according to the invention has been modified compared with the conventional SCAPE microscope 10 in that, at a specified point in time, the sample is scanned using a plurality of spatially mutually separated illumination light beams rather than just one illumination light beam. The functional components of the microscope 50 that correspond to those of the conventional SCAPE microscope 10 are provided with the reference signs used in FIGS. 1 and 2 and are not explained again in the following.

In the embodiment according to FIGS. 3 and 4, the light source 14 emits three illumination light beams 52, 54 and 56. For the purpose of simplification, the illumination light beams 52, 54 and 56 are shown in FIGS. 3 and 4 only in the form of the principal rays thereof.

The illumination light beams 52, 54, 56 are reflected by the mirror 18 through a lens 46, and from there are collimated on the scanning mirror 20. As shown in FIG. 3, the illumination light beams 52, 54, 56 are incident on the scanning mirror 20 in a manner tilted with respect to one another such that, after passing through the scan lens 24 and the tube lens 26, they enter the entrance pupil of the objective 28 in a manner tilted with respect to one another along the y-axis. This tilting along the y-axis results in the illumination light beams 52, 54, 56 having a first parallel offset along the x-axis within the sample (cf FIGS. 5 and 6). Furthermore, as shown in FIG. 4, the illumination light beams are reflected on the scanning mirror 20 such that, after passing through the scan lens 24 and the tube lens 26, they enter the entrance pupil of the objective 28 in a manner tilted with respect to one another along the x-axis. This tilting results in the illumination light beams 52, 54, 56 having a second parallel offset along the y-axis within the sample (cf FIGS. 5 and 6).

The sample is scanned along the y-axis, by the illumination light beams 52, 54, 56, by means of the scanning mirror 20 being tilted about the x-axis. Accordingly, the sample is scanned along the x-axis, by the illumination light beams 52, 54, 56, when the scanning mirror 20 is tilted about the y-axis.

The illumination light beam 52 illuminates a strip-like sample region B within the sample. Correspondingly, the illumination light beam 54 illuminates a strip-like sample region C, and the illumination light beam 56 illuminates a strip-like sample region D. After passing through the objective 28, the tube lens 26 and the scan lens 24, the fluorescent radiation that originates from the illuminated sample regions B, C and D is returned to the scanning mirror 20 in the form of separate detection light beams 58, 60 and 62, respectively. The scanning mirror 20 reflects the detection light beams 58, 60 and 62 into the erecting optical system 34. Intermediate images of the sample regions illuminated by the illumination light beams B, C and D are generated in the erecting optical system, which intermediate images are oblique relative to the plane 43 that is conjugate with the focal plane 44 of the optical system 22. In the simplified drawing according to FIG. 3, the intermediate images are denoted B', C' and D'.

The microscope 50 includes a detector 71 that is formed by three line sensors 66, 68, 70 and that captures the light beams 58, 60 and 62. In this case, the intermediate image B' is imaged in the correct position on the line sensor 66, the intermediate image C' is imaged in the correct position on the line sensor 68, and the intermediate image D' is imaged in the correct position on the line sensor 70. As shown in FIGS. 3 and 4, the line sensors 66, 68 and 70 are mutually offset according to the offset of the illuminated sample regions B, C and D within the sample, and accordingly of the intermediate images B', C', D'.

FIGS. 5 and 6 again illustrate the manner in which the strip-like sample regions B, C and D, illuminated by the illumination light beams 52, 54, 56, are imaged on the line sensors 66, 68 and 70, respectively, in the form of the detection light beams 58, 60 and 62, respectively. In this case, FIG. 5 corresponds to FIG. 3, and FIG. 6 corresponds to FIG. 4. FIGS. 5 and 6, in which the erecting optical system 34 is merely indicated, in particular show that the line sensors 66, 68 and 70 are mutually offset both axially, i.e. along the z-axis or optical axis O of the objective 28, and laterally, i.e. along the x-axis. The scanning directions in which the illumination light beams 52, 54, 56 are moved as the scanning mirror 20 is tilted are in addition indicated in FIGS. 5 and 6. If the scanning mirror 20 is tilted about the x-axis, the illumination light beams 52, 54 and 56 are thus moved along the y-axis. If, in contrast, the scanning mirror 20 is tilted about the y-axis, the illumination light beams 52, 54 and 56 are moved along the x-axis.

FIGS. 7 and 8 show a modified embodiment of the microscope 50, as a second embodiment. In this embodiment, glass blocks 72 and 74 are arranged in front of the line sensors 66 and 68. The glass blocks 72, 74 are used to compensate for the offset of the illumination light beams along the optical axis O of the objective 28. The line sensors 66, 68, 70 can thus be arranged in one plane. It is in particular also possible for an integral surface sensor having separate sensor regions that correspond to the line sensors to be provided instead of the three line sensors 66, 68, 70.

FIGS. 9 and 10 show a third embodiment in which the microscope according to the invention operates in the manner of a SPIM microscope. Accordingly, in the third embodiment two separate objectives are provided on the sample side, of which one objective 80 functions as the detection objective and one objective 82 (cf. FIG. 9) functions as the illumination objective. The two objectives 80 and 82 are arranged such that the optical axes thereof are mutually perpendicular.

FIGS. 11 and 12 show the third embodiment having a geometric representation of the respective light beams.

FIG. 13 again shows, on the basis of a block diagram, an example for the implementation of the microscope according to the invention in the manner of a SCAPE microscope. In this case, in the depiction according to FIG. 13, the arrows between the individual functional components indicate the path of the illumination light or of the detection light inside the microscope.

Figure 13:
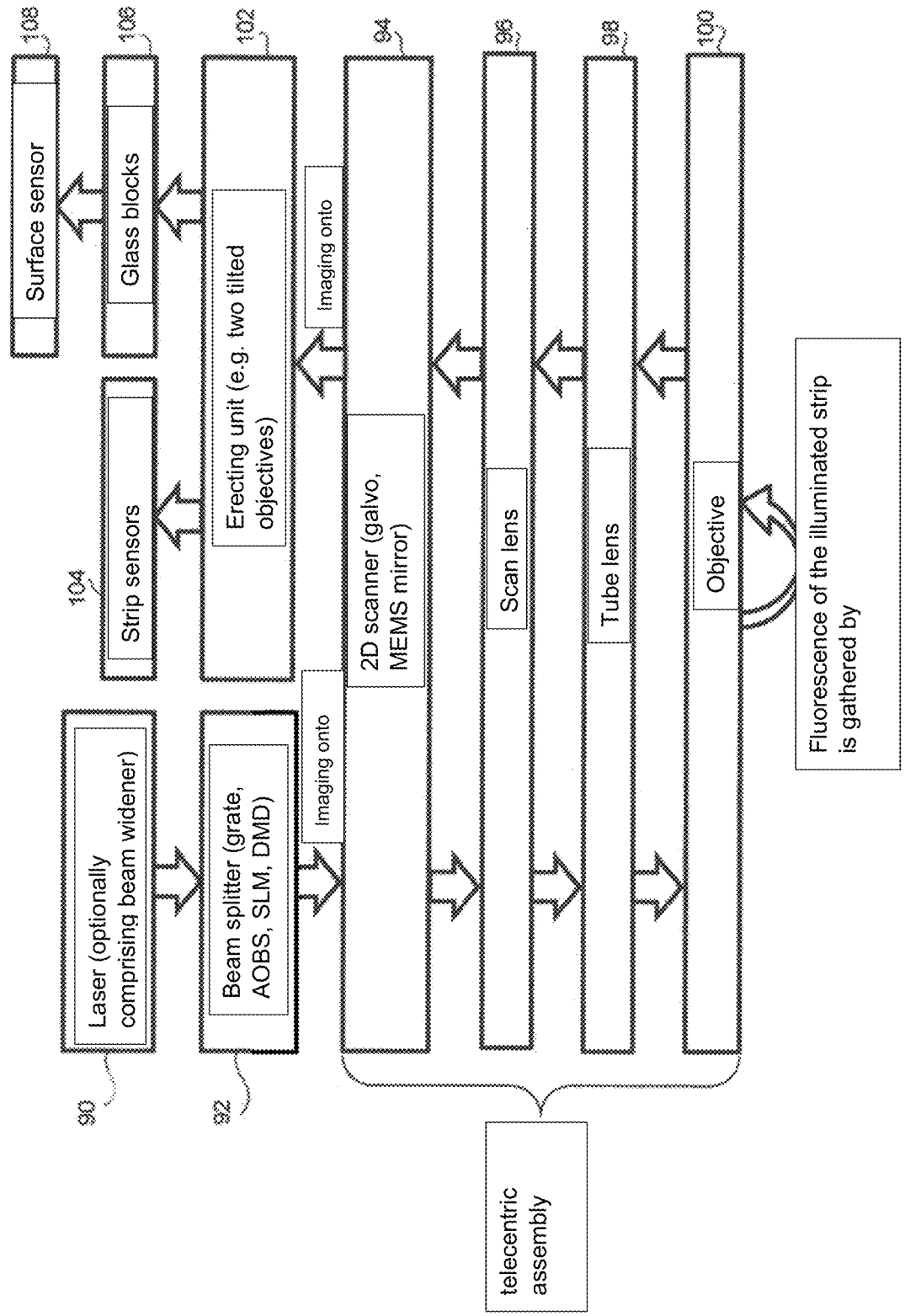
FIG. 13 is a block diagram having functional components, by way of example, for implementing a microscope according to the invention that operates in the manner of a SCAPE microscope.

The implementation according to FIG. 13 includes, as functional components given by way of example, a laser 90 as a light source which may include a beam widener, a beam splitter 92 in the form of a grate, an acousto-optical beam splitter (AOBS), a spatial light modulator (SLM) or a digital micromirror assembly, a 2D scanner 94 in the form of one or more galvanometer mirrors or MEMS mirrors, a scan lens 96, a tube lens 98, and an objective 100 which is used both for illumination and for detection. The 2D scanner 94, the scan lens 96, the tube lens 98 and the objective 100 form a telecentric system. In the part of the detection light path adjoining the 2D scanner 94, the microscope further includes an erecting optical system 102 which for example includes two objectives that are tilted relative to one another, and a plurality of line or strip sensors 104 or, in an alternative embodiment, one or more glass blocks that is/are arranged in front of a surface sensor.

Finally, FIG. 14 is a block diagram including functional components for implementing the microscope according to the invention as a SPIM microscope. The arrows between the functional components again indicate the light path of the illumination light and of the detection light. As can be seen in FIG. 14, the SPIM implementation differs from the SCAPE implementation merely in the use of a 1D scanner 94' (such as an acousto-optic deflector (AOD), a galvanometer mirror or a MEMS mirror) instead of the 2D scanner 94, and in the use of two separate sample-side objectives 100', 100" as the illumination and detection objectives, respectively, in place of the single sample-side objective 100.

The embodiments described above are to be understood as being merely by way of example. A large number of modifications are conceivable in order to implement the teaching according to the invention. For example, a mirror 18 for coupling in the illumination light is provided in the embodiment according to FIGS. 3 and 4. However, instead of the mirror 18, a dichroic mirror element may also be provided which couples the illumination light in transmission and guides the detection light to the detector in reflection (or vice versa).

The embodiments described above relate to the implementation of the microscope according to the invention in the manner of a SCAPE microscope or a SPIM microscope. However, as already mentioned above, the invention is not restricted to the implementations. Implementation as an OPM microscope is therefore also conceivable, for example. In particular, with reference to the SCAPE embodiment according to FIGS. 3 and 4, it is possible, instead of the tilting of the 2D scanning mirror 20 proposed therein, to move the objective 36 within the meaning of an OPM application (cf. the publication by Kumar et al. mentioned at the outset) in order to bring about the synchronous displacement of the illumination light beams and the plane to be imaged. In this case, beam coupling by means of the objective 36 is then necessary. Thus, whereas the scanning unit according to the invention includes a 2D scanning mirror in the case of SCAPE application, in the case of OPM application (with reference to FIGS. 3 and 4) it includes an actuator that displaces the objective 36 along the optical axis in order to offset the illumination along the y-axis, and a scanner (or alternatively a cylinder lens) for offsetting the illumination along the x-axis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 conventional SCAPE microscope
12 illumination unit
14 light source
16 illumination light beam
18 mirror
20 scanning mirror
22 optical system
24 scan lens
26 tube lens
28 objective
30 sample
32 detection light beam
34 erecting optical system
36 objective
38 objective
40 tube lens
42 line sensor
43 plane
44 focal plane
46 lens
50 microscope
52, 54, 56 illumination light beams
58, 60, 62 detection light beams
66, 68, 70 line sensors
71 detector
72, 74 glass blocks
80 detection objective
82 illumination objective 90 laser
92 beam splitter
94 2D scanner
96 scan lens
98 tube lens
100 objective
100', 100" objectives
104 strip sensors
106 glass block

The invention claimed is:

1. A microscope for imaging a sample, the microscope comprising:
    an illumination unit configured to emit an illumination light to the sample;
    a detector configured to capture a detection light originating from the sample;
    an optical system configured to focus the illumination light, emitted by the illumination unit, into the sample and configured to focus the detection light, originating from the sample, onto the detector; and
    a scanning unit configured to scan the sample using the illumination light, wherein:
    the illumination unit is configured to emit the illumination light to the scanning unit in the form of separate illumination light beams, such that, during scanning of the sample, the illumination light beams can be focused on spatially mutually separated, strip-like sample regions simultaneously,
    the detector is configured to capture the detection light in the form of separate detection light beams originating from the spatially mutually separated, strip-like sample regions simultaneously and in a spatially mutually separated manner,
    the sample regions illuminated by the illumination light beams are located in a plurality of sample planes,
    the detector comprises a plurality of sub-detectors which are each assigned to one of the sample planes, respectively, a respective sub-detector configured to capture a detection light beam of the detection light beams that originates from the sample plane assigned to the sub-detector, and
    the optical system has just one objective that simultaneously forms an illumination objective for focusing the illumination light beams, emitted by the illumination unit, into the sample, and a detection objective for focusing the detection light beams, originating from the sample, onto the detector.

2. The microscope according to claim 1, wherein the illumination unit, the scanning unit and the optical system interact such that the illumination light beams have a mutual parallel offset in the sample.

3. The microscope according to claim 2, wherein the parallel offset has a first parallel offset along a first axis that is perpendicular to an optical axis of the just one objective of the optical system, and/or a second parallel offset along a second axis that is perpendicular to the optical axis of the just one objective, the first axis and the second axis being oriented so as to be mutually perpendicular.

4. The microscope according to claim 1, wherein the scanning unit is configured to scan the sample, using the illumination light beams, along a first axis that is perpendicular to an optical axis of the just one objective of the optical system, and/or along a second axis that is perpendicular to the optical axis of the just one objective, the first axis and the second axis being oriented so as to be mutually perpendicular.

5. The microscope according to claim 4, wherein the scanning unit comprises a scanning mirror, the scanning mirror being configured to be tilted about the second axis in order to scan the sample, using the illumination light beams, along the first axis, and/or the scanning mirror being configured to be tilted about the first axis in order to scan the sample, using the illumination light beams, along the second axis.

6. The microscope according to claim 1, wherein the scanning unit is configured to descan the detection light beams focused on the detector.

7. The microscope according to claim 1, wherein:
    the illumination unit and the scanning unit interact such that the illumination light beams are incident into an entrance pupil of the just one objective in a manner mutually tilted about a second axis in order to bring about a first parallel offset, along a first axis, in the sample, and/or
    the illumination unit and the scanning unit interact such that the illumination light beams are incident into the entrance pupil of the just one objective in a manner mutually tilted about the second axis in order to bring about a second parallel offset, along the second axis, in the sample.

8. The microscope according to claim 1, wherein the illumination unit and the scanning unit interact such that the illumination light beams each illuminate only an off-center portion of an entrance pupil of the just one objective.

9. The microscope according to claim 1, wherein an erecting optical system is behind the scanning unit in a propagation direction of the detection light and comprises a first partial optical system configured to generate an intermediate image, and a second partial optical system that is oblique with respect to the first partial optical system and is configured to image the intermediate image in a correct position on the detector.

10. The microscope according to claim 1, wherein the sub-detectors are arranged in a depth-of-field of a detection optical system in front of the detector.

11. The microscope according to claim 1, wherein at least one element is arranged in front of the detector and is configured to influence an optical path length and to compensate for an offset of the sample planes.

12. The microscope according to claim 1, wherein the detector is a surface detector comprising a plurality of detector portions that form the sub-detectors.

13. The microscope according to claim 1, wherein the detector comprises a plurality of line detectors that form the sub-detectors.

14. The microscope according to claim 13, wherein the line detectors are arranged along an optical axis of a detection optical system in front of the detector, so as to have a mutual offset that corresponds to an offset of the associated sample planes.

15. The microscope according to claim 1, wherein the sample regions illuminated by the illumination light beams are located in a single sample plane.

16. The microscope according to claim 1, wherein the illumination unit comprises a single light source that emits the separate illumination light beams.

17. The microscope according to claim 1, wherein the illumination unit comprises a plurality of light sources that each emit one of the illumination light beams, respectively.

18. The microscope according to claim 1, wherein the illumination unit is configured to emit the illumination light beams such that the beams have different wavelengths.

19. The microscope according to claim 1, wherein the detector comprises a time delay integration (TDI)) line scan camera.

20. The microscope according to claim 1, wherein the scanning unit and the optical system form a telecentric system.

21. A method for microscopic imaging of a sample, the method comprising:
- emitting an illumination light to the sample by an illumination unit, the illumination light emitted by the illumination unit being focused into the sample;
- capturing a detection light originating from the sample by a detector, the detection light originating from the sample being focused onto the detector by an optical system; and
- scanning the sample, using the illumination light, and descanning the detection light focused on the detector, by a scanning unit, wherein:
- the illumination light is emitted to the scanning unit in the form of separate illumination light beams, such that, during scanning of the sample, the illumination light beams are focused on spatially mutually separated, strip-like sample regions simultaneously,
- the detector captures the detection light in the form of separate detection light beams, originating from the spatially mutually separated, strip-like sample regions, simultaneously and in a spatially mutually separated manner,
- the sample regions illuminated by the illumination light beams are located in a plurality of sample planes,
- the detector comprises a plurality of sub-detectors which are each assigned to one of the sample planes, respectively, a respective sub-detector capturing a detection light beam of the detection light beams that originates from the sample plane assigned to the sub-detector, and
- the optical system has just one objective that simultaneously forms an illumination objective for focusing the illumination light beams, emitted by the illumination unit, into the sample, and a detection objective for focusing the detection light beams, originating from the sample, onto the detector.

* * * * *